United States Patent
Kelly (10) Patent No.: US 12,473,864 B2
(45) Date of Patent: Nov. 18, 2025

(54) INTEGRATED TURBINE ENGINE BLEED SYSTEM

(71) Applicant: Hamilton Sundstrand Corporation, Charlotte, NC (US)

(72) Inventor: Myles Kelly, Willimantic, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 18/653,064

(22) Filed: May 2, 2024

(65) Prior Publication Data

US 2025/0341188 A1 Nov. 6, 2025

(51) Int. Cl.
*F02C 9/18* (2006.01)

(52) U.S. Cl.
CPC ..................................... *F02C 9/18* (2013.01)

(58) Field of Classification Search
CPC ..... F02C 6/08; F02C 9/18; F02C 3/04; B64D 2013/0603; B64D 2013/0607; B64D 2013/0618
See application file for complete search history.

(56) References Cited

U.S. PATENT DOCUMENTS

| | | | |
|---|---|---|---|
| 8,529,189 B2 * | 9/2013 | Brown | F02C 7/14 415/17 |
| 9,222,411 B2 * | 12/2015 | Sennoun | F01D 25/12 |
| 10,767,562 B2 * | 9/2020 | Liu | F02C 7/185 |
| 11,078,841 B2 | 8/2021 | Mackin et al. | |
| 12,173,656 B1 * | 12/2024 | Tripathi | F02C 7/32 |
| 2013/0187007 A1 * | 7/2013 | Mackin | F02C 9/18 60/785 |
| 2013/0192240 A1 * | 8/2013 | Munsell | F01D 25/22 60/39.83 |
| 2017/0241340 A1 * | 8/2017 | Feulner | F02C 7/185 |
| 2018/0057171 A1 * | 3/2018 | Sautron | F02C 9/18 |
| 2022/0381181 A1 * | 12/2022 | Briley | F02C 9/18 |
| 2023/0228231 A1 | 7/2023 | Miller et al. | |

* cited by examiner

*Primary Examiner* — Thuyhang N Nguyen
(74) *Attorney, Agent, or Firm* — CANTOR COLBURN LLP (57) ABSTRACT

A turbine engine for an aircraft includes a compressor with a low-pressure spool including a low-pressure tap and a high-pressure spool including a high-pressure tap and a combustor connected to the compressor. The engine includes a turbine connected to the combustor and that includes an inlet section connected to the outlet portion of the combustor and an outlet section. The engine also includes an integrated engine bleed system connected to the compressor and a plurality of aircraft sub-systems. The integrated engine bleed system connects the high/low pressure taps various aircraft sub-systems.

12 Claims, 6 Drawing Sheets

INTEGRATED TURBINE ENGINE BLEED SYSTEM

BACKGROUND

Exemplary embodiments pertain to the art of turbine engines for aircraft and, more particularly, to an integrated turbine engine bleed system for an aircraft.

Many aircraft are powered by turbine engines. Turbine engines include a compressor, a combustor, and a turbine. The compressor compresses air which is combined with fuel in the combustor to create a mixture that is ignited to create high-pressure gases. The high-pressure gases expand through the turbine creating energy that may be used to power the aircraft. The compressor includes a number of stages that produce high-pressure air and low-pressure air. Aircraft include a number of systems that rely on the high-pressure air and low-pressured air.

Engine buffer systems, environmental control systems, start systems, stability systems, and the like rely on a supply of pressurized air. Typically, each system that employs pressurized air includes a dedicated supply or bleed line. That is, each system includes an individualized engine bleed line that supplies high-pressure air or low-pressure air. In some cases, a system may require two individual bleed lines. High-pressure air typically is supplied at a temperature that is much higher than the low-pressure air. As such, certain systems may include a heat exchanger that employs the low-pressure air as a cooling medium to condition the high-pressure air.

BRIEF DESCRIPTION

Disclosed is a turbine engine for an aircraft. The turbine engine includes a compressor including an inlet, an outlet, a low-pressure spool arranged between the inlet and the outlet, and a high-pressure spool arranged between the low-pressure spool and the outlet. The low-pressure spool includes a low-pressure tap and the high-pressure spool includes a high-pressure tap. The engine also includes a combustor connected to the compressor and that includes an inlet portion connected to the outlet of the compressor and an outlet portion. The engine also includes a turbine connected to the combustor. The turbine also includes an inlet section connected to the outlet portion of the combustor and an outlet section. The engine further includes an integrated engine bleed system connected to the compressor and a plurality of aircraft sub-systems. The integrated engine bleed system includes a first inlet fluidically connected to the low-pressure tap, a second inlet fluidically connected to the high-pressure tap, and a plurality of outlets connected to corresponding ones of the plurality of aircraft sub-systems, the integrated engine bleed system including at least two shut-off valves connected to the high-pressure tap and at least one heat exchanger (HX) connected to the low-pressure tap and the high-pressure tap, the at least two shut-off valves including a first shut-off valve having a first shut-off valve inlet fluidically connected to the high-pressure tap and a first shut-off valve outlet fluidically connected to two of the plurality of aircraft sub-systems and a second shut-off valve having a second shut-off valve inlet fluidically connected to the high-pressure tap and a second shut-off valve outlet fluidically connected to another two of the aircraft sub-systems.

In addition to one or more of the features described above, or as an alternative to any of the foregoing embodiments, the HX can include a first HX circuit having a first HX circuit inlet fluidically connected to the first shut-off valve and a first HX circuit outlet fluidically connected to the two of the plurality of aircraft sub-systems and a second HX circuit including a second HX circuit inlet fluidically connected to the low-pressure tap and a second HX Circuit outlet fluidically connected to ambient, the second HX circuit passing through the first HX in a heat exchange relationship with the second HX circuit.

In addition to one or more of the features described above, or as an alternative to any of the foregoing embodiments, the engine can further include a low-pressure feed fluidically connected between the low-pressure tap and the first HX circuit inlet downstream of the first shut-off valve.

In addition to one or more of the features described above, or as an alternative to any of the foregoing embodiments, the engine can further include a check valve arranged in the low-pressure feed.

In addition to one or more of the features described above, or as an alternative to any of the foregoing embodiments, the engine can further include a third shut-off valve arranged between the first HX circuit outlet and the two of the plurality of aircraft sub-systems.

In addition to one or more of the features described above, or as an alternative to any of the foregoing embodiments, the engine can further include a fourth shut-off valve arranged between the second HX circuit outlet and at least one of the another two of the aircraft sub-systems.

In addition to one or more of the features described above, or as an alternative to any of the foregoing embodiments, the first shut-off valve can include a first shut-off valve inlet and the second shut-off valve includes a second shut-off valve inlet.

In addition to one or more of the features described above, or as an alternative to any of the foregoing embodiments, the engine can further include a fourth shut-off valve arranged between the first HX circuit outlet and another of the two of the plurality of aircraft sub-systems and a fifth shut-off valve fluidically arranged between the first shut-off valve inlet and the second shut-off valve inlet and one of the another two of the plurality of aircraft sub-systems.

In addition to one or more of the features described above, or as an alternative to any of the foregoing embodiments, the engine can further include a first sensor associated with the first shut-off valve and a second sensor associated with the second shut-off valve.

In addition to one or more of the features described above, or as an alternative to any of the foregoing embodiments, the engine can further include a controller operatively connected to the first shut-off valve and the second shut-off valve. The controller may establish a position of at least one of the first shut-off valve and the second shut-off valve based on feedback provided by at least one of the first sensor and the second sensor.

Also disclosed is aircraft. The aircraft can include in of turbine engine as disclosed above or otherwise herein. In one embodiment, the aircraft can also include: a fuselage including at least one wing, and a tail, a plurality of sub-systems arranged in the aircraft, the plurality of sub-systems including an engine buffer system, an environmental control system (ECS), an anti-icing system, a start system, and a stability system. The fuselage can support the turbine engine.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
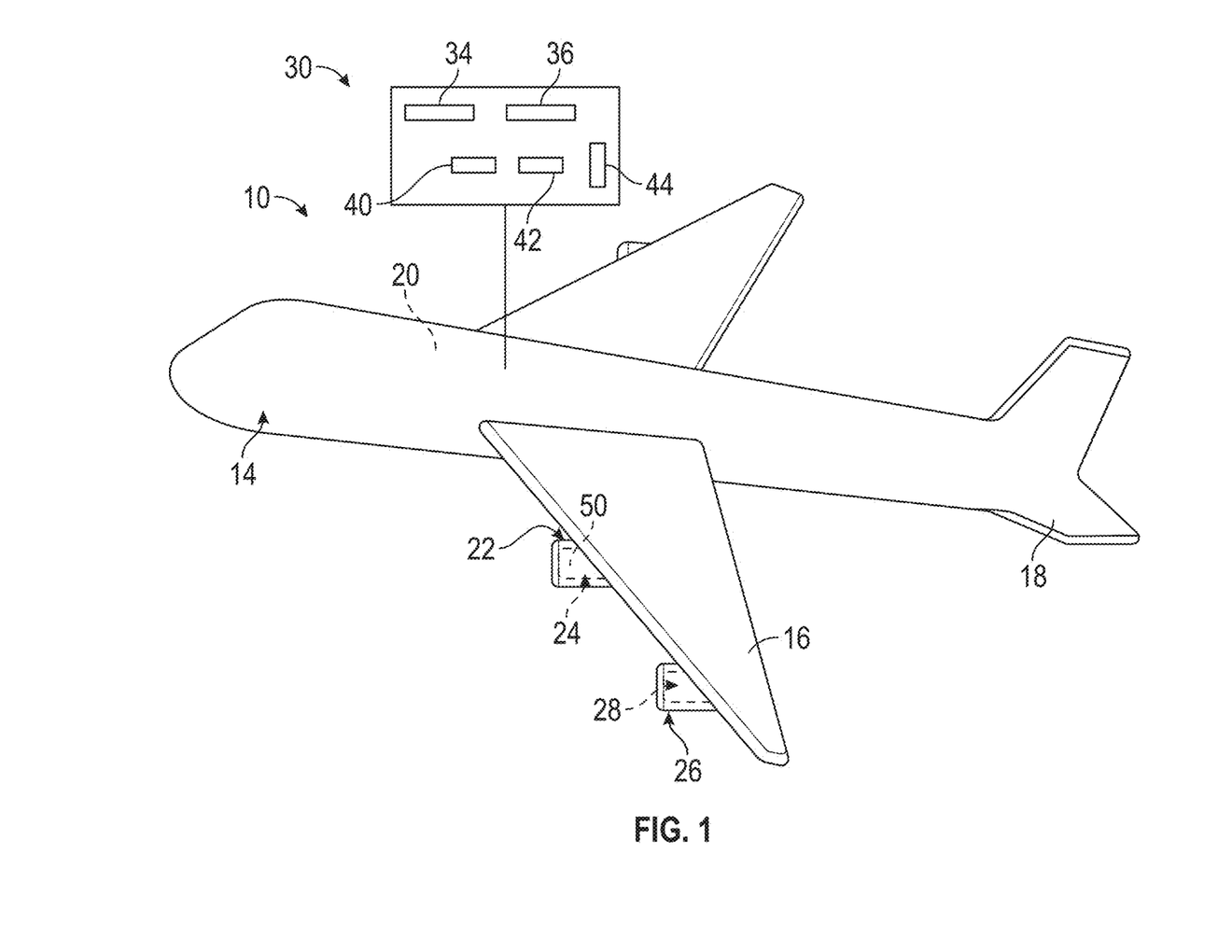
FIG. 1 is a schematic view of an aircraft including a turbine engine having an integrated engine bleed system, in accordance with a non-limiting example.

An aircraft in accordance with a non-limiting example is indicated generally at 10 in FIG. 1. Aircraft 10 includes a fuselage 14 supporting a pair of wings, one of which is shown at 16, and a tail 18. Fuselage 14 defines, in part, a cabin 20 that accommodates crew and/or passengers. Wing 16 supports a first nacelle 22 surrounding a first turbine engine 24 and a second nacelle 26 surrounding a second turbine engine 28. Fuselage 14 includes a plurality of sub-systems 30 including an engine buffer system 34, an environmental control system (ECS) 36 that conditions cabin air, an anti-icing system 40, a start system 42, and a stability system 44.

As will be detailed herein, first turbine engine 24 includes an integrated engine bleed system 50 that delivers low-pressure bleed air and/or high-pressure bleed air to each of the plurality of sub-system 30. As will also be detailed more fully herein, integrated engine bleed system 50 distributes bleed air from a single source of low-pressure bleed air and a single source of high-pressure bleed air to each of the plurality of sub-systems 30. By receiving and distributing bleed air from the single source of low-pressure bleed air and the single source of high-pressure bleed air integrated engine bleed system reduces needed plumbing, component weight, control systems, monitoring systems and the like while maintaining bleed air supply to each system.

Figure 2:
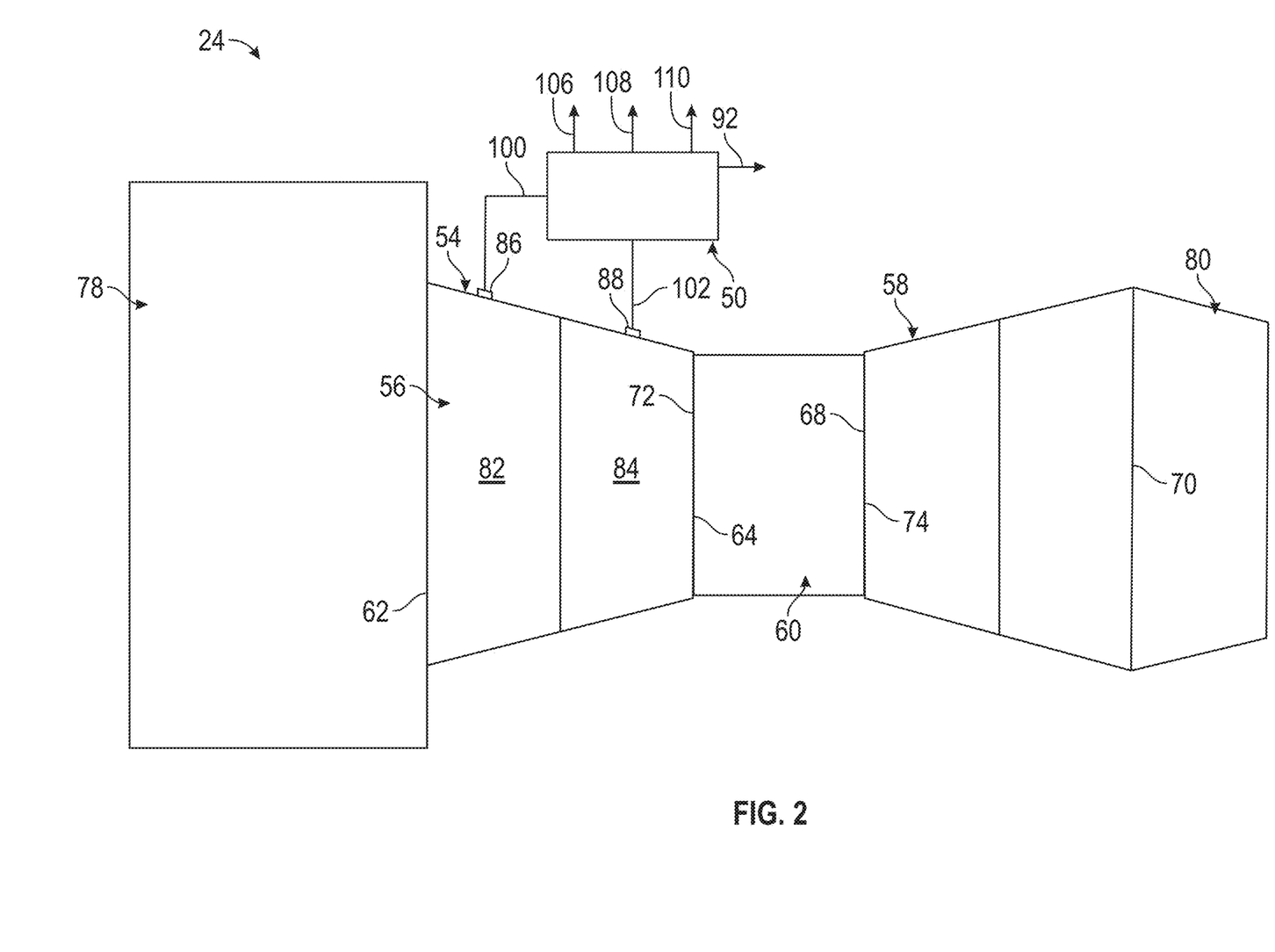
FIG. 2 is a schematic view of a turbine engine having an integrated engine bleed system, in accordance with a non-limiting example.

Reference will now follow to FIG. 2 in describing first turbine engine 24 with an understanding that second turbine engine 28 includes similar structure. First turbine engine 24 includes a frame 54 surrounding a compressor 56 operatively and fluidically connected to a turbine 58 through a combustor 60. Compressor 56 includes a compressor inlet 62 compressor outlet 64. Turbine 58 includes a turbine inlet 68 and a turbine outlet 70. Combustor 60 includes a combustor inlet 72 coupled to compressor outlet 64 and a combustor outlet 74 coupled to turbine inlet 68.

First turbine engine 24 includes a fan 78 mounted to compressor inlet 62 and an exhaust frame 80 arranged at turbine outlet 70. Compressor 56 includes a low-pressure spool 82 and a high-pressure spool 84. Frame 54 supports a low-pressure tap or bleed port 86 fluidically connected to low-pressure spool 82 and a high-pressure tap or bleed port 88 fluidically connected to high-pressure spool 84. In a non-limiting example, integrated engine bleed system 50 interfaces between low-pressure bleed port 86, high-pressure bleed port 88, the plurality of sub-systems 30, and ambient 92 as will be detailed more fully herein. At this point, it should be understood that while shown and described as being associated with first turbine engine 24, second turbine engine 28 may also include a similar integrated engine bleed system in order to maintain component redundancy.

Figure 3:
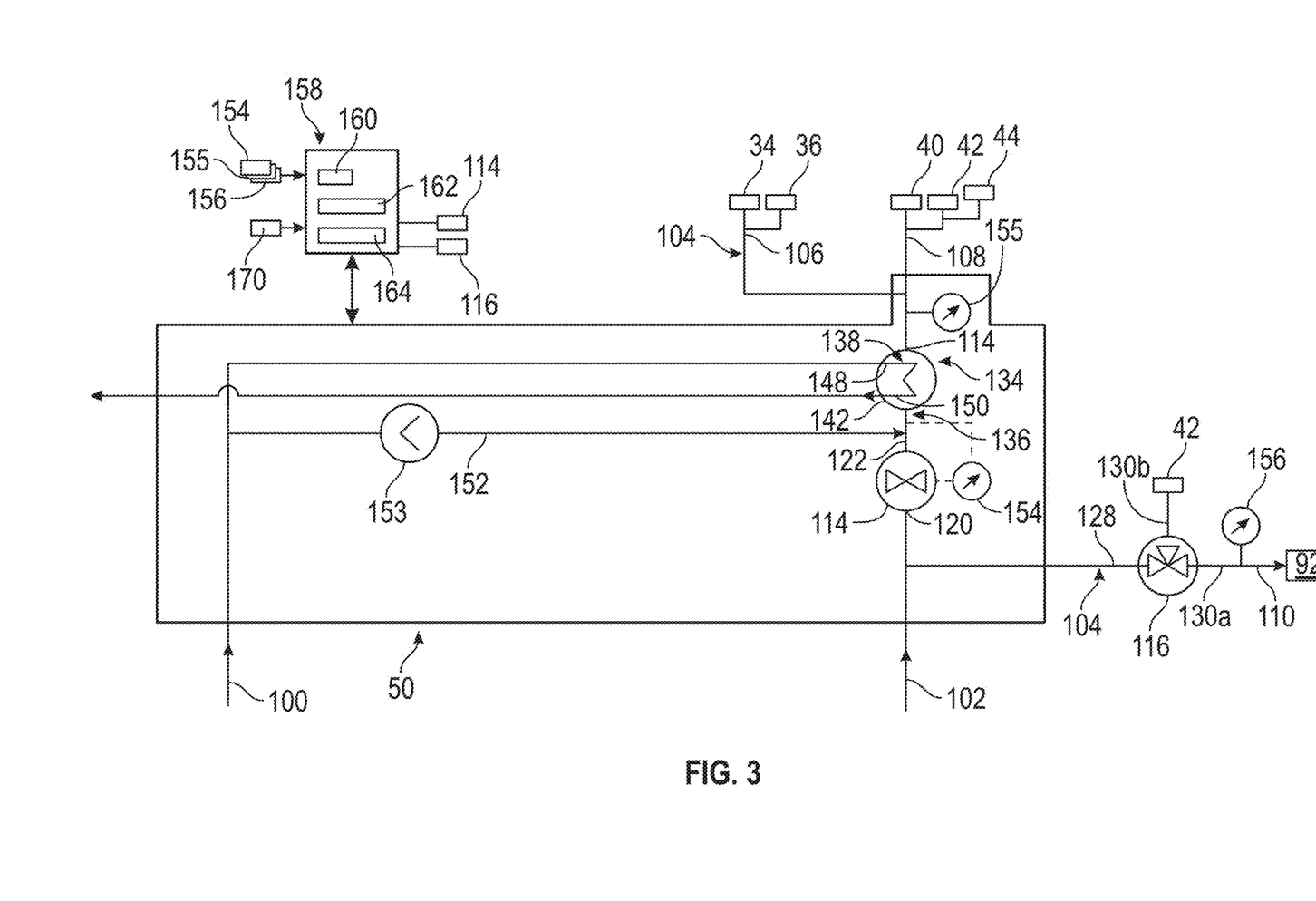
FIG. 3 is a schematic view of the integrated engine bleed system, in accordance with a non-limiting example.

Reference will now follow to FIG. 3 in describing integrated engine bleed system 50 in accordance with a non-limiting example. Integrated engine bleed system 50 includes a first inlet 100 fluidically connected to low-pressure bleed port 86 and a second inlet 102 fluidically connected to high-pressure bleed port 88, and a plurality of outlets 104. Plurality of outlets 104 includes a first outlet 106 fluidically connected to two or more of the plurality of sub-systems 30, a second outlet 108 fluidically connected to another two or more of the plurality of sub-systems 30, and a third outlet 110 fluidically connected to ambient 92. In a non-limiting example, first outlet 106 may be selectively connected to engine buffer system 34 and ECS 36. Second outlet 108 may be selectively connected to, for example, anti-icing system 40, start system 42 and/or stability system 44.

In a non-limiting example, integrated engine bleed system 50 includes a first shut-off valve 114 and a second shut-off valve 116 fluidically connected to second inlet 102. First shut-off valve 114 includes a first shut-off valve inlet 120 connected to second inlet 102 and a first shut-off valve outlet 122. Second shut-off valve 116 includes a second shut-off valve inlet 128 connected to second inlet 102, a second shut-off valve outlet 130a, and a second shut-off valve outlet 130b. In a non-limiting example, first shut-off valve outlet 122 is fluidically connected to a heat exchanger (HX) 134. HX 134 includes a first HX circuit 136 that delivers conditioned fluid to first outlet 106 and a second HX circuit 138 arranged in a heat exchange relationship with first circuit 136.

First HX circuit 136 includes a first HX circuit inlet 142 and a first HX circuit outlet 144. Second HX circuit 138 includes a second HX circuit inlet 148 and a second HX circuit outlet 150. Second HX circuit 138 passes a fluid passing from low-pressure spool 82 having a first temperature in a heat exchange relationship with fluid passing from high-pressure spool 84 at a second temperature that is higher than the first temperature. In this manner, an overall temperature of the fluid passing from second HX outlet 150 is reduced. Additional fluid may pass from low-pressure spool 82 through a conduit 152 connected downstream of first shut-off valve outlet 122. Conduit 152 includes a check valve 153 that prevents flow exiting first shut-off valve outlet 122 from passing back to low-pressure spool 82.

First shut-off valve 114 controls fluid flow into second HX circuit inlet 148 and second shut-off valve 116 controls fluid flow to various ones of the plurality of sub-systems 30 as well as to ambient based on detected demand as well as fluid temperature. In a non-limiting example, integrated engine bleed system 50 includes a first sensor 154 associated with first shut-off valve 114, a second sensor 155 associated with second shut-off valve 116, and a third sensor 156 associated with second HX circuit outlet 150. First sensor 154, second sensor 155, and third sensor 156 are connected to a controller 158 that establishes a selected position of first shut-off valve 114 and second shut-off valve 116 to selectively deliver bleed air to selected one of the plurality of sub-systems 30.

Controller 158 includes a central processing unit (CPU) 160, a non-volatile memory 162, and a shut-off valve controller 164. Controller 158 receives inputs from first sensor 154, second sensor 155, third sensor 156 as well as a sub-system demand control 170 in order to select a position, on, off, or between on and off for each shut-off valve 114 and 116. The fluid may pass from first inlet 100 and/or second inlet 102 and flow to select ones of the plurality of sub-systems 30 as demand arises. In this manner, integrated engine bleed system 50 may regulate pressure to select ones of the plurality of sub-systems without the need for multiple pressure taps or individual pressure feeds.

Figure 4:
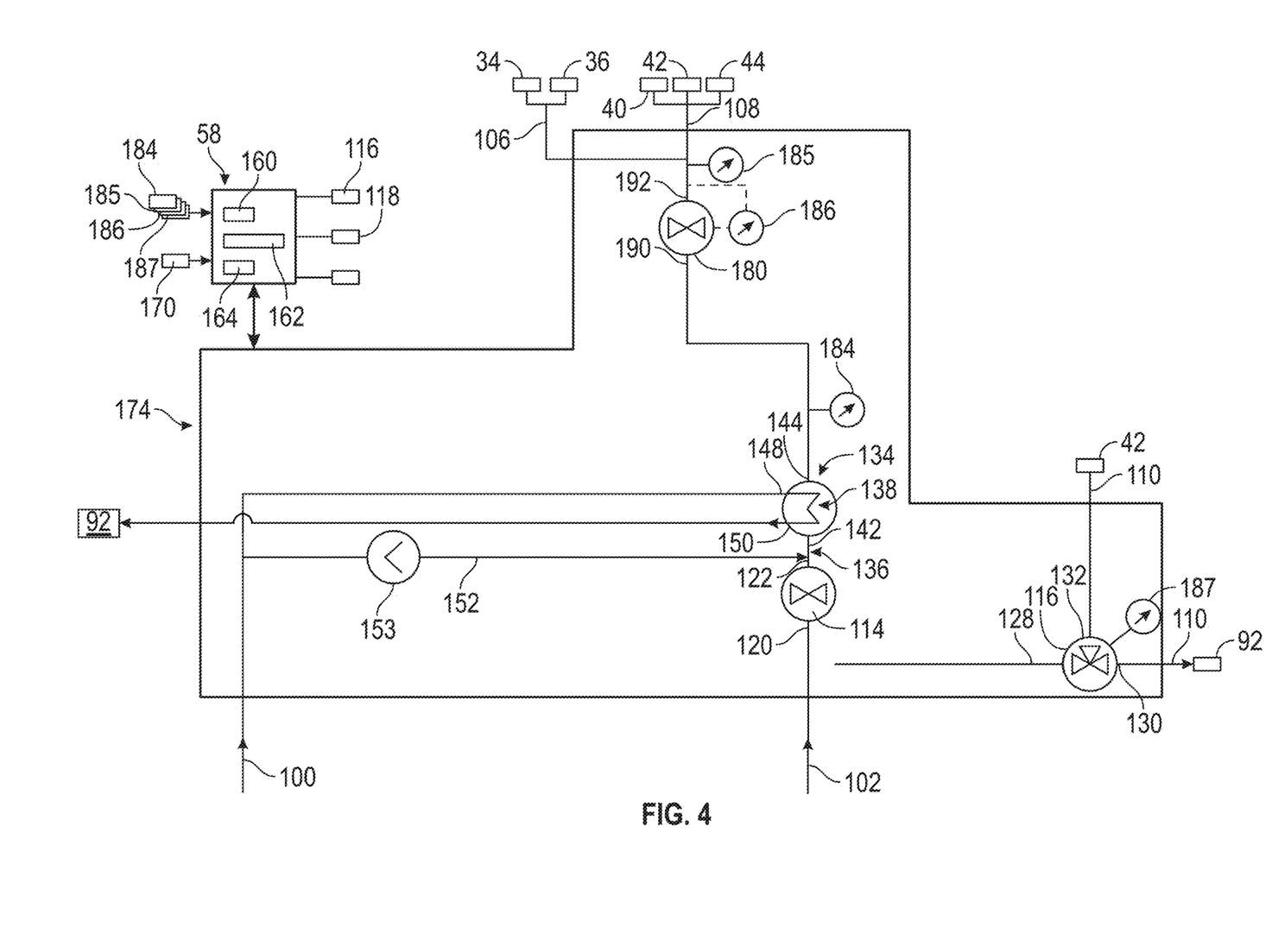
FIG. 4 is a schematic view of the integrated engine bleed system, in accordance with another non-limiting example.

Reference will now follow to FIG. 4, wherein like reference numbers represent corresponding parts in the respective views in describing an integrated engine bleed system 174 in accordance with another non-limiting example. In addition to first shut-off valve 114 and second shut off valve 116, integrated engine bleed system 174 includes a third shut-off valve 180 connected between first HX circuit outlet 144 and the plurality of sub-systems 30. Third shut-off valve 180 includes a third shut-off valve inlet 190 and a third shut-off valve outlet 192. Integrated engine bleed system 174 further includes a first sensor 184, a second sensor 185, a third sensor 186, and a fourth sensor 187 that are operatively connected to controller 158.

First sensor 184 is connected to first HX circuit outlet 144, second sensor 185 is connected to second shut-off valve outlet 130, third sensor 186 is connected to third shut-off valve 180 and fourth sensor 187 is connected downstream of third shut-off valve outlet 192 and upstream of the two of the plurality of sub-systems 30. In a manner similar to that described herein, controller 158 receives inputs from first sensor 184, second sensor 185, third sensor 186, fourth sensor 187 as well as a sub-system demand control 170 in order to select a position, on, off, or between on and off for each shut-off valve 114, 116, and 180. The fluid may pass from first inlet 100 and/or second inlet 102 and flow to select ones of the plurality of sub-systems 30 as demand arises. In this manner, integrated engine bleed system 174 may regulate pressure to select ones of the plurality of sub-systems 30 without the need for multiple pressure taps or individual pressure feeds.

Figure 5:
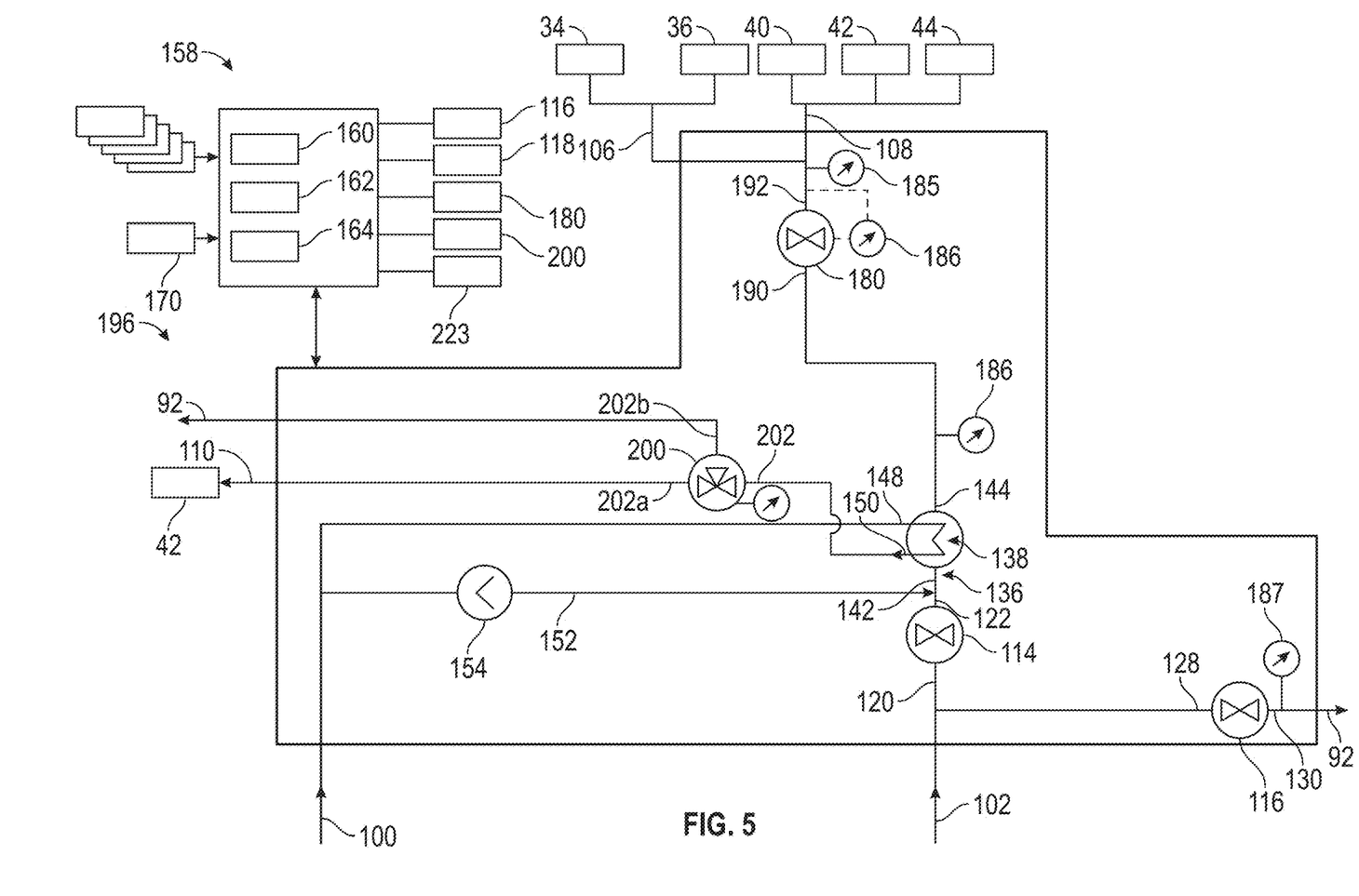
FIG. 5 is a schematic view of the integrated engine bleed system, in accordance with yet another non-limiting example.

Reference will now follow to FIG. 5, wherein like reference numbers represent corresponding parts in the respective views in describing an integrated engine bleed system 196 in accordance with another non-limiting example. In addition to first shut-off valve 114, second shut off valve 116, and third shut-off valve 180 integrated engine bleed system 196 includes a fourth shut-off valve 200. Fourth shut-off valve 200 includes a fourth shut-off valve inlet 202 fluidically connected with second HX circuit outlet 150 and a fourth shut-off valve outlet 204*a* fluidically connected to one of the plurality of sub-systems 30 and second fourth shut-off valve outlet 204*b* connected to ambient 92.

Integrated engine bleed system 196 further includes a first sensor 208, a second sensor 209, a third sensor 210, a fourth sensor 211, and a fifth sensor 212 that are operatively connected to controller 158. First sensor 208 is connected to second HX circuit outlet 150, second sensor 209 is connected to second shut-off valve outlet 130, third sensor 210 is connected to third shut-off valve 180, fourth sensor 211 is connected downstream of third shut-off valve outlet 192 and upstream of the two of the plurality of sub-systems 30, and fifth sensor 212 is connected to fourth shut-off valve 200.

In a manner similar to that described herein, controller 158 receives inputs from first sensor 208, second sensor 209, third sensor 210, fourth sensor 211, fifth sensor 212 as well as a sub-system demand control 170 in order to select a position, on, off, or between on and off for each shut-off valve 114, 116, 180, and 200. The fluid may pass from first inlet 100 and/or second inlet 102 and flow to select ones of the plurality of sub-systems 30 as demand arises. In this manner, integrated engine bleed system 196 may regulate pressure to select ones of the plurality of sub-systems 30 without the need for multiple pressure taps or individual pressure feeds.

Figure 6:
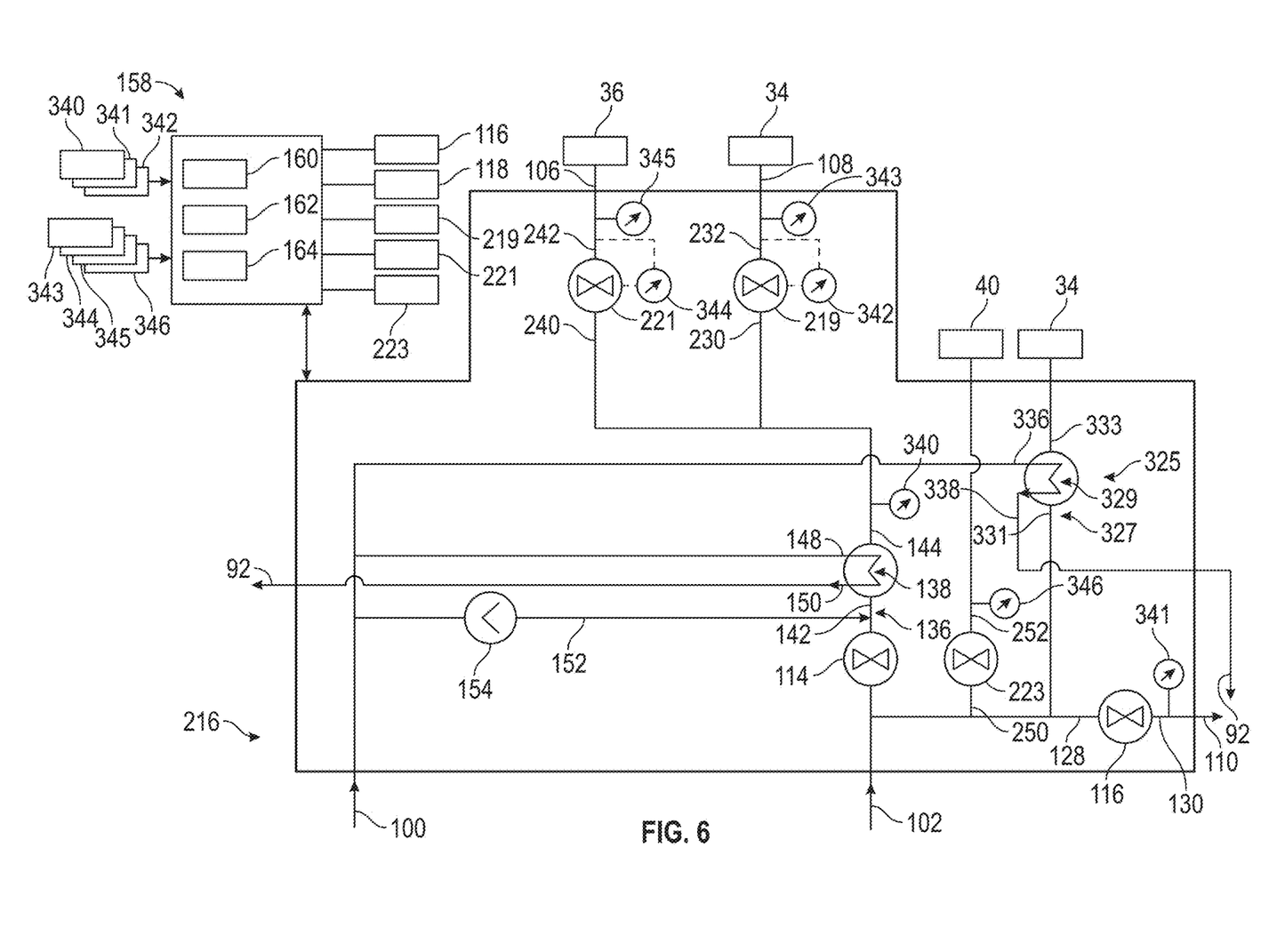
FIG. 6 is a schematic view of the integrated engine bleed system, in accordance with yet another non-limiting example.

Reference will now follow to FIG. 6, wherein like reference numbers represent corresponding parts in the respective views in describing an integrated engine bleed system 216 in accordance with yet another non-limiting example. In addition to first shut-off valve 114, and second shut off valve 116, integrated engine bleed system 196 includes a third shut-off valve 219, a fourth shut-off valve 221, and a fifth shut-off valve 223.

In a non-limiting example, third shut-off valve 219 includes a third shut-off valve inlet 230 fluidically connected to first HX circuit outlet 144 and a third shut off valve outlet 232 fluidically connected to one of the plurality of sub-systems 30 for example engine buffer system 34. Similarly, fourth shut-off valve 221 includes a fourth shut-off valve inlet 240 fluidically connected to first HX circuit outlet 144 and a fourth shut-off valve outlet 242 fluidically connected to another one of the plurality of sub-systems 30, for example ECS 36. Fifth shut-off valve 223 includes a fifth shut-off valve inlet 250 fluidically connected with high-pressure tap 88 and a fifth shut-off valve outlet 252 fluidically connected to yet another one of the plurality of sub-systems 30, for example, anti-ice system 40.

Integrated engine bleed system 216 also includes another HX 325 including a first HX circuit portion 327 and a second HX circuit portion 329. First HX circuit portion 327 includes a first HX circuit portion inlet 331 fluidically connected to high-pressure tap 88 and a first HX circuit portion outlet 333 fluidically connected to one of the plurality of sub-systems 30, for example, engine buffer system 34. Second HX circuit portion 329 includes a second HX circuit portion inlet 336 and a second HX circuit portion outlet 338. Second HX circuit portion inlet is fluidically connected to low-pressure tap 86 and second HX circuit portion outlet 338 is fluidically connected to ambient.

Integrated engine bleed system 196 further includes a first sensor 340, a second sensor 341, a third sensor 342, a fourth sensor 343, a fifth sensor 344, a sixth sensor 345, and a seventh sensor 346 that are operatively connected to controller 158. First sensor 340 is connected to first HX circuit outlet 144, second sensor 341 is connected to second shut-off valve outlet 130, third sensor 342 is connected to third shut-off valve 219, fourth sensor 343 is connected to one of the plurality of sub-systems 30 downstream from third shut-off valve outlet 232. Fifth sensor 344 is connected to fourth shut-off valve 221, sixth sensor 345 is connected to one of the plurality of sub-systems 30 downstream from fourth shut-off valve 221, and seventh sensor 346 is connected to fifth shut-off valve outlet 252.

In a manner similar to that described herein, controller 158 receives inputs from first sensor 340, second sensor 341, third sensor 342, fourth sensor 343, fifth sensor 344, sixth sensor 345, and seventh sensor 346 as well as sub-system demand control 170 in order to select a position, on, off, or between on and off for each shut-off valve 114, 116, 219, 221, and 223. The fluid may pass from first inlet 100 and/or second inlet 102 and flow to select ones of the plurality of sub-systems 30 as demand arises. In this manner, integrated engine bleed system 196 may regulate pressure to select ones of the plurality of sub-systems 30 without the need for multiple pressure taps or individual pressure feeds.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A turbine engine for an aircraft comprising:
   a compressor including an inlet, an outlet, a low-pressure spool arranged between the inlet and the outlet, and a high-pressure spool arranged between the low-pressure spool and the outlet, the low-pressure spool including a low-pressure tap and the high-pressure spool including a high-pressure tap;
   a combustor connected to the compressor, the combustor including an inlet portion connected to the outlet of the combustor and an outlet portion;
   a turbine connected to the combustor, the turbine including an inlet section connected to the outlet portion of the combustor and an outlet section; and
   an integrated engine bleed system connected to the compressor and a plurality of aircraft sub-systems, the integrated engine bleed system including:
   a first inlet fluidically connected to the low-pressure tap;
   a second inlet fluidically connected to the high-pressure tap;
   a plurality of outlets connected to corresponding ones of the plurality of aircraft sub-systems;
   at least two shut-off valves connected to the high-pressure tap; and
   at least one heat exchanger (HX) connected to the low-pressure tap and the high-pressure tap;
   wherein the at least two shut-off valves include a first shut-off valve having a first shut-off valve inlet fluidically connected to the high-pressure tap and a first shut-off valve outlet fluidically connected to two of the plurality of aircraft sub-systems and a second shut-off valve having a second shut-off valve inlet fluidically connected to the high-pressure tap and a second shut-off valve outlet fluidically connected to another two of the aircraft sub-systems;
   wherein the HX includes:
   a first HX circuit having a first HX circuit inlet fluidically connected to the first shut-off valve and a first HX circuit outlet fluidically connected to the two of the plurality of aircraft sub-systems; and
   a second HX circuit including a second HX circuit inlet fluidically connected to the low-pressure tap and a second HX Circuit outlet fluidically connected to ambient, the second HX circuit passing through the HX in a heat exchange relationship with the second HX circuit;
   the turbine further comprising:
   a low-pressure feed fluidically connected between the low-pressure tap and the first HX circuit inlet downstream of the first shut-off valve;
   a check valve arranged in the low-pressure feed;
   a third shut-off valve arranged between the first HX circuit outlet and the two of the plurality of aircraft sub-systems; and
   a fourth shut-off valve arranged between the second HX circuit outlet and at least one of the another two of the aircraft sub-systems.

2. The turbine engine according to claim 1, further comprising:
   a first sensor associated with the first shut-off valve and a second sensor associated with the second shut-off valve.

3. The turbine engine according to claim 2, further comprising:
   a controller operatively connected to the first shut-off valve and the second shut-off valve, the controller establishing a position of at least one of the first shut-off valve and the second shut-off valve based on feedback provided by at least one of the first sensor and the second sensor.

4. An aircraft comprising:
   a fuselage including at least one wing, and a tail;
   a plurality of sub-systems arranged in the aircraft, the plurality of sub-systems including an engine buffer system, an environmental control system (ECS), an anti-icing system, a start system, and a stability system; and
   a turbine engine as recited in claim 1 supported by the fuselage.

5. The aircraft according to claim 4, further comprising:
   a first sensor associated with the first shut-off valve; and
   a second sensor associated with the second shut-off valve.

6. The aircraft according to claim 5, further comprising:
   a controller operatively connected to the first shut-off valve and the second shut-off valve, the controller establishing a position of at least one of the first shut-off valve and the second shut-off valve based on feedback provided by at least one of the first sensor and the second sensor.

7. A turbine engine for an aircraft comprising:
   a compressor including an inlet, an outlet, a low-pressure spool arranged between the inlet and the outlet, and a high-pressure spool arranged between the low-pressure spool and the outlet, the low-pressure spool including a low-pressure tap and the high-pressure spool including a high-pressure tap;
   a combustor connected to the compressor, the combustor including an inlet portion connected to the outlet of the combustor and an outlet portion;
   a turbine connected to the combustor, the turbine including an inlet section connected to the outlet portion of the combustor and an outlet section; and an integrated engine bleed system connected to the compressor and a plurality of aircraft sub-systems, the integrated engine bleed system including:
a first inlet fluidically connected to the low-pressure tap;
a second inlet fluidically connected to the high-pressure tap;
a plurality of outlets connected to corresponding ones of the plurality of aircraft sub-systems;
at least two shut-off valves connected to the high-pressure tap; and
at least one heat exchanger (HX) connected to the low-pressure tap and the high-pressure tap;
wherein the at least two shut-off valves include a first shut-off valve having a first shut-off valve inlet fluidically connected to the high-pressure tap and a first shut-off valve outlet fluidically connected to two of the plurality of aircraft sub-systems and a second shut-off valve having a second shut-off valve inlet fluidically connected to the high-pressure tap and a second shut-off valve outlet fluidically connected to another two of the aircraft sub-systems;
wherein the first shut-off valve includes a first shut-off valve inlet and the second shut-off valve includes a second shut-off valve inlet;
wherein the HX includes:
a first HX circuit having a first HX circuit inlet fluidically connected to the first shut-off valve and a first HX circuit outlet fluidically connected to the two of the plurality of aircraft sub-systems; and
a second HX circuit including a second HX circuit inlet fluidically connected to the low-pressure tap and a second HX Circuit outlet fluidically connected to ambient, the second HX circuit passing through the HX in a heat exchange relationship with the second HX circuit;
the turbine further comprising:
a low-pressure feed fluidically connected between the low-pressure tap and the first HX circuit inlet downstream of the first shut-off valve;
a check valve arranged in the low-pressure feed;
a third shut-off valve arranged between the first HX circuit outlet and the two of the plurality of aircraft sub-systems; and
a fourth shut-off valve arranged between the first HX circuit outlet and another of the two of the plurality of aircraft sub-systems; and a fifth shut-off valve fluidically arranged between the first shut-off valve inlet and the second shut-off valve inlet and one of the another two of the plurality of aircraft sub-systems.

8. An aircraft comprising:
a fuselage including at least one wing, and a tail;
a plurality of sub-systems arranged in the aircraft, the plurality of sub-systems including an engine buffer system, an environmental control system (ECS), an anti-icing system, a start system, and a stability system; and
a turbine engine as recited in claim 7 supported by the fuselage.

9. The aircraft according to claim 8, further comprising:
a first sensor associated with the first shut-off valve; and
a second sensor associated with the second shut-off valve.

10. The aircraft according to claim 9, further comprising:
a controller operatively connected to the first shut-off valve and the second shut-off valve, the controller establishing a position of at least one of the first shut-off valve and the second shut-off valve based on feedback provided by at least one of the first sensor and the second sensor.

11. The turbine engine according to claim 7, further comprising:
a first sensor associated with the first shut-off valve and a second sensor associated with the second shut-off valve.

12. The turbine engine according to claim 11, further comprising:
a controller operatively connected to the first shut-off valve and the second shut-off valve, the controller establishing a position of at least one of the first shut-off valve and the second shut-off valve based on feedback provided by at least one of the first sensor and the second sensor.

* * * * *